United States Patent
Rella et al.

(10) Patent No.: US 9,778,110 B1
(45) Date of Patent: Oct. 3, 2017

(54) SELF-REFERENCING CAVITY ENHANCED SPECTROSCOPY (SRCES) SYSTEMS AND METHODS

(71) Applicant: Picarro Inc., Santa Clara, CA (US)

(72) Inventors: Chris W. Rella, Sunnyvale, CA (US); Sze M. Tan, Sunnyvale, CA (US); Yonggang He, Union City, CA (US)

(73) Assignee: Picarro, Inc., Santa Clara, CA (US)

( * ) Notice: Subject to any disclaimer, the term of this patent is extended or adjusted under 35 U.S.C. 154(b) by 0 days.

(21) Appl. No.: 14/690,318

(22) Filed: Apr. 17, 2015

Related U.S. Application Data

(60) Provisional application No. 61/981,112, filed on Apr. 17, 2014.

(51) Int. Cl.
| | | |
|---|---|---|
| *G01J 3/42* | (2006.01) | |
| *G01J 3/12* | (2006.01) | |
| *G01J 3/06* | (2006.01) | |
| *G01J 3/02* | (2006.01) | |
| *G01J 3/28* | (2006.01) | |

(52) U.S. Cl.
CPC ............. *G01J 3/42* (2013.01); *G01J 3/0275* (2013.01); *G01J 3/06* (2013.01); *G01J 2003/2853* (2013.01); *G01J 2003/2859* (2013.01); *G01J 2003/423* (2013.01)

(58) Field of Classification Search
CPC ............. G01N 21/39; G01N 21/031; G01N 2021/391; G01J 3/42; G01J 3/4338; G01J 3/26
USPC .................... 356/432–437, 317, 326, 328
See application file for complete search history.

(56) References Cited

U.S. PATENT DOCUMENTS

| | | | |
|---|---|---|---|
| 5,412,676 A * | 5/1995 | Schnier | H01S 3/1303 372/18 |
| 6,452,680 B1 * | 9/2002 | Paldus | G01J 3/42 250/343 |
| 6,795,190 B1 | 9/2004 | Paul et al. | |
| 6,859,284 B2 | 2/2005 | Rella et al. | |
| 6,982,999 B1 | 1/2006 | Richman et al. | |
| 7,035,298 B2 | 4/2006 | Vodopyanov et al. | |
| 7,106,763 B2 | 9/2006 | Tan et al. | |
| 7,154,595 B2 | 12/2006 | Paldus et al. | |
| 7,173,754 B2 | 2/2007 | Vodopyanov et al. | |
| 7,259,856 B2 | 8/2007 | Kachanov et al. | |
| 7,265,842 B2 | 9/2007 | Paldus et al. | |
| 7,420,686 B2 | 9/2008 | Tan | |
| 7,535,573 B2 | 5/2009 | Kachanov et al. | |
| 7,646,485 B2 | 1/2010 | Tan | |
| 7,813,886 B2 | 10/2010 | Tan | |
| 7,902,534 B2 * | 3/2011 | Cole | G01J 1/44 250/573 |
| 8,264,688 B1 | 9/2012 | Tan | |

(Continued)

*Primary Examiner* — Sang Nguyen
(74) *Attorney, Agent, or Firm* — Law Office of Andrei D Popovici, PC

(57) ABSTRACT

Described self-referencing cavity enhanced spectroscopy (SRCES) systems and methods are tailored to acquiring spectra in a middle regime, in which signals are lower than optimal for conventional absorption spectroscopy, and absorption is higher than optimal for cavity ring-down spectroscopy (CRDS). Longitudinal mode resonance spectral peaks are analyzed individually to extract intensity ratios (e.g. maximum to minimum) and/or curve-fitting parameters, obviating the need to measure or precisely control the input light intensity.

39 Claims, 9 Drawing Sheets

(56) References Cited

U.S. PATENT DOCUMENTS

| | | |
|---|---|---|
| 8,537,362 B2 | 9/2013 | He et al. |
| 8,982,352 B1 | 3/2015 | Hoffnagle et al. |
| 9,116,047 B2* | 8/2015 | Koulikov .................. G01J 3/45 |
| 2005/0012931 A1 | 1/2005 | Tan et al. |
| 2005/0168826 A1 | 8/2005 | Koulikov et al. |
| 2006/0083284 A1 | 4/2006 | Paldus et al. |
| 2006/0181710 A1* | 8/2006 | Kachanov .............. G01N 21/39 |
| | | 356/437 |
| 2011/0216311 A1* | 9/2011 | Kachanov .......... G01N 21/1702 |
| | | 356/213 |
| 2013/0100973 A1* | 4/2013 | Bondu .................. H01S 3/1392 |
| | | 372/28 |
| 2014/0125993 A1* | 5/2014 | Kachanov ................ G01J 3/26 |
| | | 356/519 |

* cited by examiner

SELF-REFERENCING CAVITY ENHANCED SPECTROSCOPY (SRCES) SYSTEMS AND METHODS

RELATED APPLICATION DATA

This application claims the benefit of the filing date of U.S. Provisional Patent Application No. 61/981,112, filed Apr. 17, 2014, which is herein incorporated by reference.

BACKGROUND

The invention relates to systems and methods for performing spectroscopy.

A number of conventional spectroscopy techniques are used to analyze samples through the study of an interaction between the sample and light. These conventional techniques include direct absorption spectroscopy and cavity ring-down spectroscopy (CRDS). Direct absorption spectroscopy involves directly measuring an intensity transmission through an optical cavity with a sample, and comparing the results to a measured intensity transmission through an empty optical cavity. The absorption of light by the sample changes as a function of frequency, which enables the generation of an absorption spectrum of the sample. Direct absorption spectroscopy is effective when measuring relatively large amount of sample and/or a sample that interacts strongly with light. Direct absorption spectroscopy becomes less effective when analyzing a small amount of sample and/or a sample that interacts weakly with light. For such measurements, CRDS is generally more effective. CRDS measures ringdown times, i.e. amounts of time it takes for light that excites a resonant optical chamber and interacts with a sample to decay to a fraction of its initial intensity, for example 1/e). An absorption spectrum can be generated from measured ring-down times.

SUMMARY

According to one aspect, a spectroscopy apparatus comprises: a resonant optical cavity configured to hold a sample; an optical detector configured to detect optical signals emitted from the optical cavity and generate electrical signals from the optical signals, the optical signals defining a plurality of intensity values characterizing a response of the sample to light in the optical cavity as a frequency of the light is scanned over a range of frequencies spanning a plurality of longitudinal mode resonance spectral peaks; and a processor electrically connected to the optical detector and configured to determine, from the electrical signals, a sample absorption coefficient by fitting at least two intensity values characterizing a longitudinal mode resonance spectral peak to a model of the longitudinal mode resonance spectral peak.

According to another aspect, a non-transitory computer-readable medium stores instructions which, when executed by a hardware processor, cause the processor to: receive electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and determine, from the electrical signals, a sample absorption coefficient by fitting at least two intensity values characterizing a longitudinal mode resonance spectral peak to a model of the longitudinal mode resonance spectral peak.

According to another aspect, a computer system comprises a hardware processor and associated memory configured to: receive electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and determine, from the electrical signals, a sample absorption coefficient by fitting at least two intensity values characterizing a longitudinal mode resonance spectral peak to a model of the longitudinal mode resonance spectral peak.

According to another aspect, a method comprises: receiving electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and determining, from the electrical signals, a sample absorption coefficient by fitting at least two intensity values characterizing a longitudinal mode resonance spectral peak to a model of the longitudinal mode resonance spectral peak.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

Systems and methods described herein may include or employ one or more spectrometers including control/acquisition computer systems as described below. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass storage (non-transitory) media such as magnetic, optic, and semiconductor media (e.g. hard drives, optical disks, flash memory, DRAM), as well as communications links such as conductive cables and fiber optic links. According to some embodiments, the present invention provides, inter alia, optical systems such as spectrometers including computer systems programmed to perform methods described herein, as well as computer-readable media encoding instructions to perform methods described herein.

Figure 1:
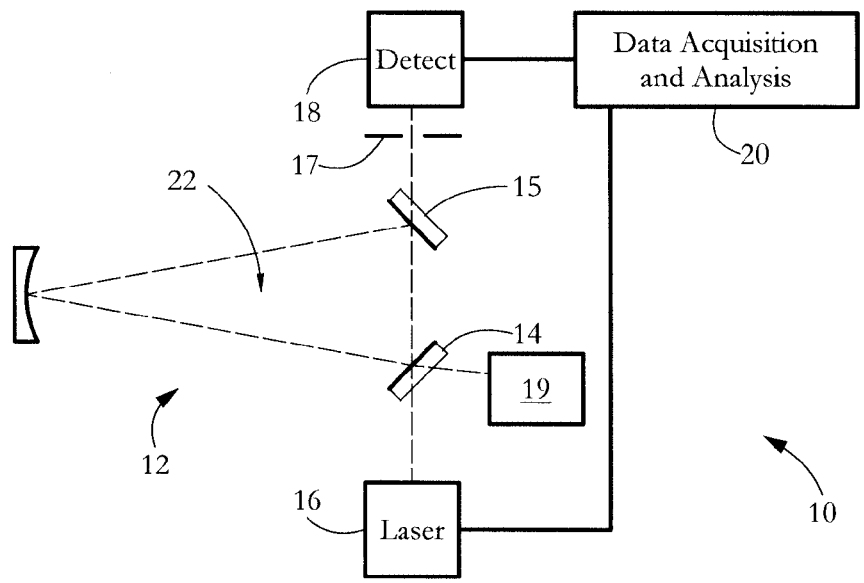
FIG. 1 illustrates an exemplary spectroscopy system according to some embodiments of the present invention.

FIG. 1 depicts an exemplary optical system 10 according to some embodiments of the present invention. Optical system 10 may be a spectrometer. Optical system 10 includes a resonant optical cavity 12 comprising two or more mirrors including an input mirror 14 and an output mirror 15, a laser light source 16 in optical communication with cavity 12, an optical detector 18 optically connected to cavity 12, and a data acquisition and analysis computer system 20 electrically connected to source 16 and detector 18. Resonant optical cavity 12 is configured to hold a sample 22. Source 16 is configured to send monochromatic light into cavity 12. Source 16 may include or be optically coupled to a dedicated photodetector or other device capable of measuring the optical power produced by source 16, as well as a dedicated high-precision wavelength monitor capable of measuring the exact wavelength of light emitted by source 16. Detector 18 is configured to detect optical signals emitted from cavity 12. Data acquisition and analysis computer system 20 is configured to perform a number of control and data acquisition and analysis steps described below. In particular, computer system 20 may be used control a frequency of light emitted by source 16, and analytical methods performed by computer system 20 as described below are used to characterize samples of interest placed within cavity 12.

In some embodiments, optical system 10 may be designed so as to minimize the impact of higher-order transverse modes on detected signals, and in particular on the intensity detected for frequencies along longitudinal mode inter-peak minima, described below. Higher-order transverse modes may have slightly different resonant frequencies than the $TEM_{00}$ Gaussian mode, and thus may cause undesired effects on detected intensities, particularly for frequencies along minima between different longitudinal mode peaks. In some embodiments cavity 12 may be confocal cavity, i.e. a cavity characterized by a mirror radius of curvature R equal to a cavity length L. Confocal cavities may be characterized by degenerate higher-order transverse modes and may exhibit particularly clean (smoothly varying) intensity maxima and minima, and in particular may exhibit less variation in intensity along inter-peak intensity minima. Additionally, in some embodiments an optical spatial filter 17 is positioned in an optical path between cavity 12 and detector 18. Spatial filter 17 may be a pinhole or other spatial obstruction configured to filter out higher-order cavity transverse modes. Also, in some embodiments focusing and beam steering optics positioned in the optical path between source 16 and cavity 12 may be used to match the spatial mode of the input laser beam to the fundamental $TEM_{00}$ Gaussian mode of cavity 12, to minimize the potential effects of transverse mode resonances.

In some embodiments, a second optical detector 19 may be used to detect input light incident from source 16 and reflected by input mirror 14. Because the light reflected by input mirror 14 is due to the summed electric fields of the reflected input beam and transmitted intracavity power, information related to the wavelength spectrum of the input beam, including the linewidth and the tuning rate, is embedded in the reflected signal. Signals from second optical detector 19 may be used to decouple the effect of the linewidth of source 16 from transmitted signals detected by detector 18, effectively separating detected intensity variations caused by cavity 12 from those caused by fluctuations in the intensity of light emitted by source 16. Additionally, in some embodiments, signals from a dedicated photodetector and dedicated high-precision wavelength monitor forming part of (or coupled to) light source 16 may also be used to improve the quality of the spectral data collected by the apparatus.

In some embodiments, a calibration procedure performed on a cavity without a sample, and/or at wavelength(s) at which the sample does not have a significant absorption, may be used determine a relationship between the signals received from second detector 19 and adjustments to be performed on the collected spectral data for different measurement conditions. In some embodiments, the calibration procedure includes performing measurements on an empty cavity, for different scanning speeds and different input laser linewidths, to determine how the reflected signal detected by second detector 19 and the output signal detected by detector 18 depend on scanning speed, input laser linewidth, and/or other calibration parameter(s) of interest. The results of the calibration procedure may be used in conjunction with data obtained from second detector 19 and/or the optical power and wavelength monitors of source 16 to correct the spectral data collected using detector 18, in order to reduce the effects of extraneous factors on the spectral data of interest.

Figure 2:
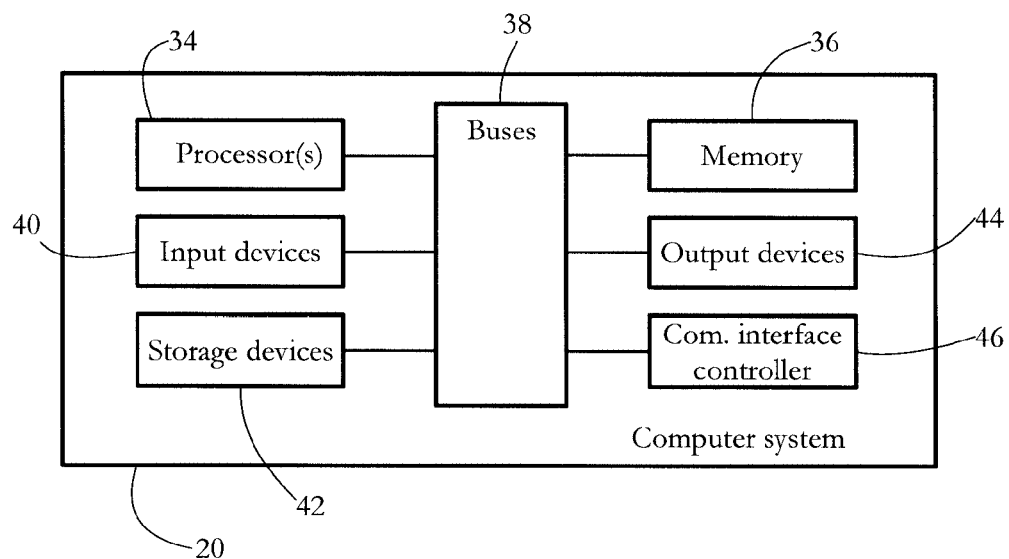
FIG. 2 illustrates a plurality of hardware components of the system of FIG. 1 according to some embodiments of the present invention.

In some embodiments, computer system 20 comprises a plurality of hardware components, schematically illustrated in FIG. 2. In some embodiments, computer system 20 comprises one or more processors 34, a memory unit 36, a set of input devices 40, a set of output devices 44, a set of storage devices 42, and a communication interface controller 46, all connected by a set of buses 38. In some embodiments, processor 34 comprises a physical device (e.g. multi-core integrated circuit) configured to execute computational operations with a set of signals and/or data. In some embodiments, such computational operations are delivered to processor 34 in the form of a sequence of processor instructions (e.g. machine code or other type of software). Memory unit 36 may comprise random-access memory (RAM) storing instructions and operands accessed and/or generated by processor 34. Input devices 40 may include touch-sensitive interfaces, computer keyboards and mice, among others, allowing a user to introduce data and/or instructions into system 18. Output devices 44 may include display devices such as monitors. In some embodiments, input devices 40 and output devices 44 may share a common piece of hardware, as in the case of touch-screen devices. Storage devices 42 include computer-readable media enabling the storage, reading, and writing of software instructions and/or data. Exemplary storage devices 42 include magnetic and optical disks and flash memory devices, as well as removable media such as CD and/or DVD disks and drives. Communication interface controller 46 enables system 18 to connect to a computer network and/or to other machines/computer systems. Typical communication interface controllers 46 include network adapters. Buses 38 collectively represent the plurality of system, peripheral, and chipset buses, and/or all other circuitry enabling the inter-communication of devices 34-46 of computer system 18.

In some embodiments, the frequency of light emitted by laser light source 16 is scanned, linearly or otherwise, over a range of values large enough to encompass multiple longitudinal mode resonance peaks. Scanning the frequency of monochromatic light emitted by source 16 may be achieved under the control of computer system 20 by ramping a source current of source 16 or other known methods.

Cavity 12 houses a sample 22 of interest, which may be in gaseous, solid or liquid form. If the composition of sample 22 within cavity 12 is kept fixed and the current waveform used is periodic in time, the intracavity intensity of light is not necessarily periodic with time even after all transients have died away, because a major component of a laser linewidth of source 16 is due to stochastic processes which do not repeat in time. Although the results for individual periods differ, an average over many periods may be computed and this average converges to a deterministic mean value, which can be compared with theoretical predictions. The rate of convergence depends on the relative linewidths of cavity 12 and source 16. When the linewidth of cavity 12 is large compared to the linewidth of source 16, a convergence to the mean is fast, so this is the regime in which the comparison of the average over many periods to theoretical predictions is expected to be most successful.

Figure 3:
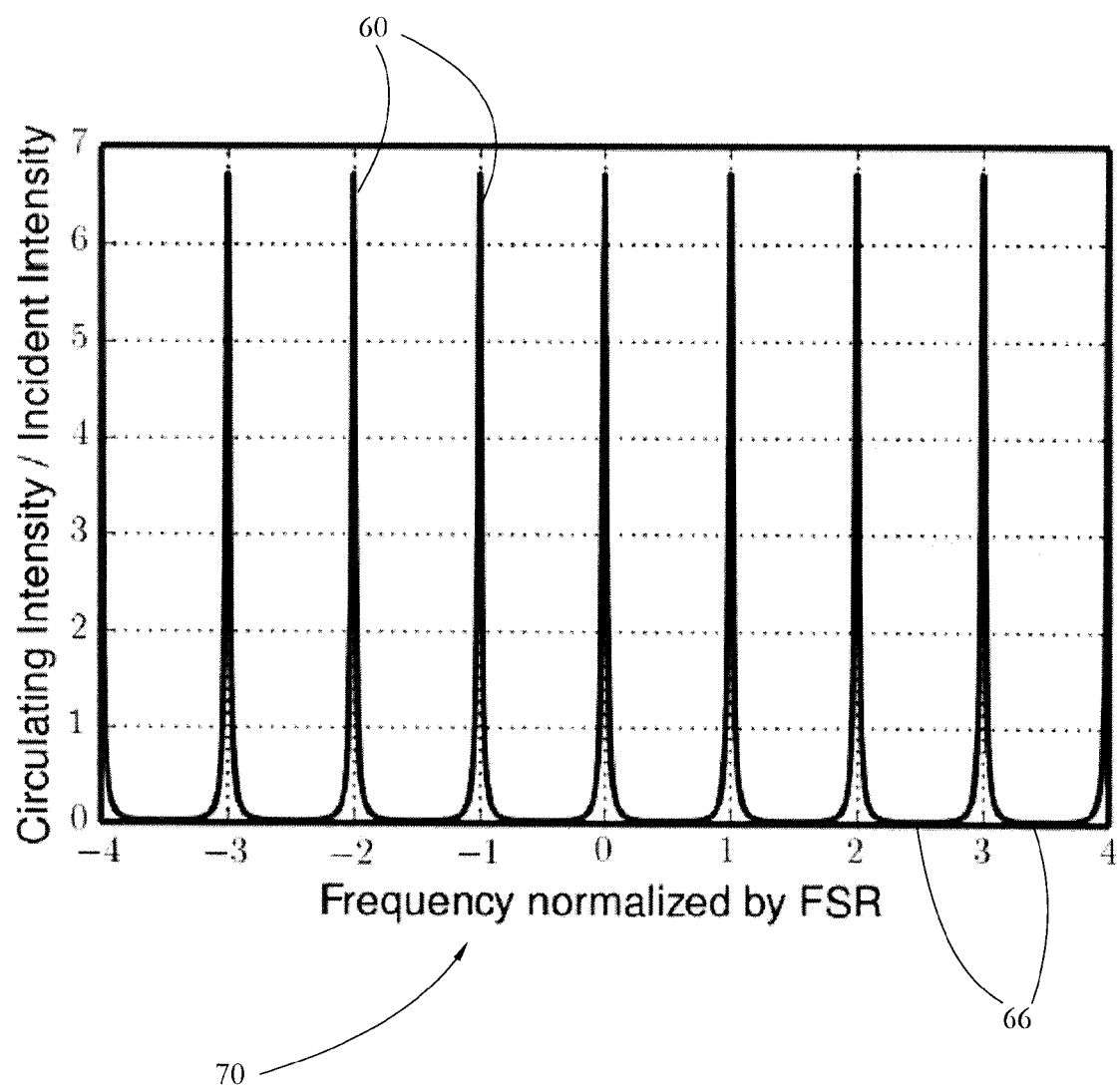
FIG. 3 depicts an idealized frequency response of a resonant optical cavity when excited by a laser according to some embodiments of the present invention.

FIG. 3 depicts an idealized frequency response of cavity 12 when excited by source 16 according to some embodiments of the present invention. The data of FIG. 3 are determined according to equation (1):

$$\frac{I_{circ}}{I_{inc}} = \frac{|t|^2}{|1 - r\exp(-\alpha p - j2\pi vp/c)|^2} \quad (1)$$

In equation (1), t is an amplitude transmission coefficient of input mirror 14 and r is a product of multiple amplitude reflection coefficients of all mirrors comprising cavity 12. In equation (1), $\alpha$ represents a sample absorption coefficient, p is a round-trip length of cavity 12, and v is a frequency of incident light generated by source 16. The variables t, r, and $\alpha$ may be taken to be frequency-independent in the discussion below.

As seen in FIG. 3, maxima 60 of a circulating intensity occur close to the frequencies at which $r \exp(-j2\pi vp/c)$ is real and positive, and minima 66 occur close to the frequencies at which $r \exp(-j2\pi vp/c)$ is real and negative. Successive maxima 60 (or minima 66) are spaced by the cavity free spectral range $v_{FSR}=c/p$. Each maximum is the center of a peak whose full width at half maximum is given by equation (2) below:

$$(\Delta v)_{FWHM} = \frac{2c}{\pi p}\sin^{-1}\left(\frac{1-r'}{2\sqrt{r'}}\right) = \frac{(\Delta v)_{FSR}}{\mathcal{F}} \quad (2)$$

In equation (2), $r'=r \exp(-\alpha p)$ represents an amplitude change over a round-trip due to both mirror losses and a material absorption of the sample, and $$\mathcal{F} = \left[\frac{2}{\pi}\sin^{-1}\left(\frac{1-r'}{2\sqrt{r'}}\right)\right]^{-1} \quad (3)$$

represents a finesse, defined as a ratio of a free spectral range to a full width at half maximum. If cavity 12 is used in a ring-down spectrometer, the equivalent ring-down time is $\tau=[2\pi(\Delta v)_{FWHM}]^{-1}$. We may use a circulating intensity in equation (1) even though in practice we may measure a transmitted intensity in practice. The circulating intensity and the transmitted intensity are generally related by a proportionality constant.

Equation (1) represents a steady-state result, computed on the assumption that the frequency of the incident light is constant. When the frequency of the light is swept linearly through resonances at a rate of R Hz s$^{-1}$, equation (1) may still be applied quasi-statically using the instantaneous frequency for v, provided the dimensionless quantity $\pi(\Delta v)^2_{FWHM}/R \gg 1$. When the above condition is met, the optical energy in the cavity can achieve full resonance before the frequency of the laser shifts appreciably, or in other words, the chirp is slow enough that the change in instantaneous frequency of the light over the decay time of the cavity is small compared to the cavity linewidth.

According to some embodiments of the present invention, sample absorption coefficients are determined by analyzing individual cavity longitudinal mode spectral peaks, so as to obviate the need to measure or precisely control the input light intensity. Such methods, referred-to below as self-referencing cavity enhanced spectroscopy (SRCES), include methods employing intensity ratio analysis and curve-fitting analysis as described below.

Intensity Ratio Analysis

Figure 4:
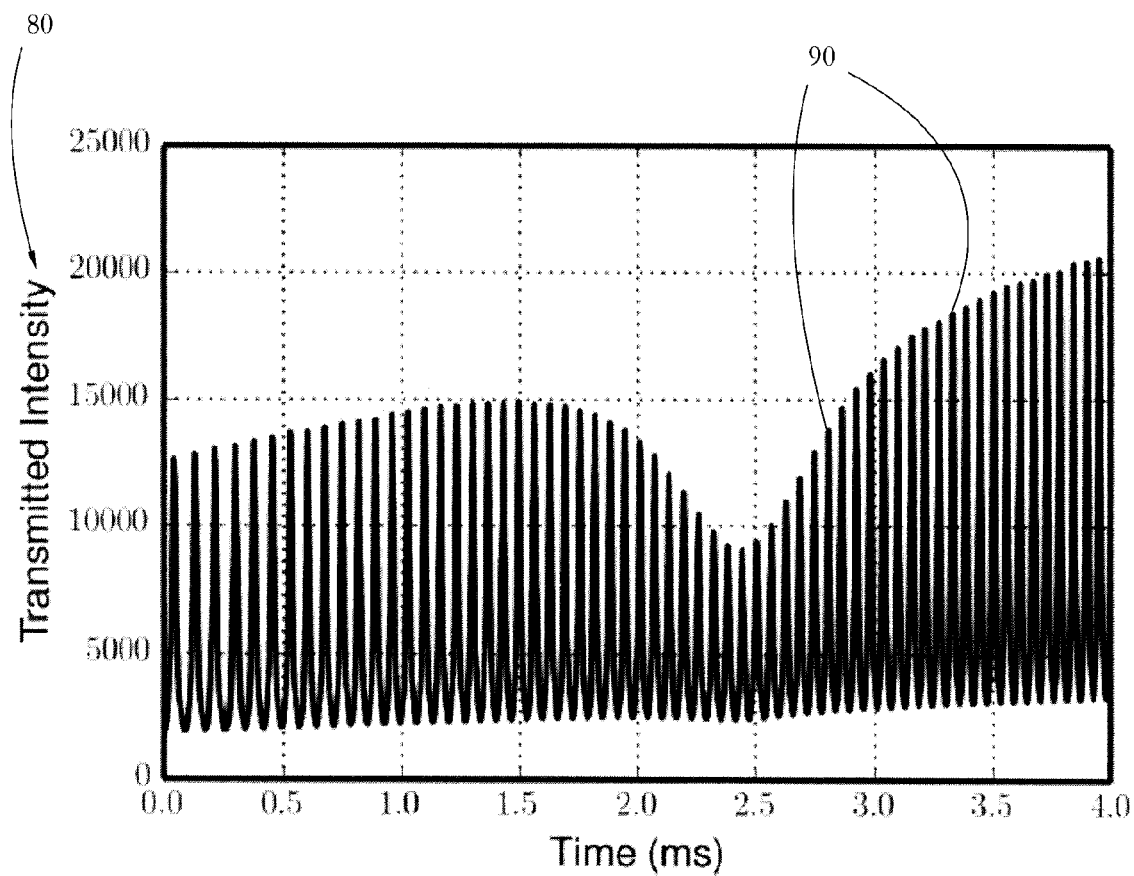
FIG. 4 shows a result of measuring the light transmitted through a low-finesse, $F \approx 3.8$, resonant optical cavity with a round-trip length p=48.5 cm containing room air at atmospheric pressure according to some embodiments of the present invention.

According to some embodiments of the present invention, one type of SRCES uses a ratio of a maximum intensity characterizing a longitudinal mode resonance spectral peak to a minimum intensity characterizing the longitudinal mode resonance spectral peak. Such a method partitions a measured transmitted intensity spectrum as shown in FIG. 4 into local pieces, each piece encompassing a longitudinal mode resonance spectral peak. Subsequently, locating the maximum intensity characterizing the longitudinal mode resonance spectral peak and the minimum intensity characterizing the longitudinal mode resonance spectral peak may be done by performing localized curve fitting near the maximum or minimum of the peak, by selecting one experimentally measured maximum or minimum point of the peak, or by another method that converts the measured data points into a value representing a peak maximum or minimum. The maximum intensity characterizing a longitudinal mode resonance spectral peak can be represented by equation (4):

$$\frac{(I_{circ})_{max}}{I_{inc}} = \frac{|t|^2}{|1 - r\exp(-\alpha p)|^2} \quad (4)$$

A corresponding minimum intensity characterizing a longitudinal mode resonance spectral peak can be represented by equation (5):

$$\frac{(I_{circ})_{min}}{I_{inc}} = \frac{|t|^2}{|1 + r\exp(-\alpha p)|^2}. \quad (5)$$

Although the frequencies at which a maximum and its adjacent minimum occur may be separated by the cavity free spectral range, it is often the case that the quantities $I_{inc}$, t, r and $\alpha$ do not change an appreciable amount between adjacent extrema in some embodiments of the present invention. As a result, a ratio of the maximum intensity characterizing a longitudinal mode resonance spectral peak to the minimum intensity characterizing a longitudinal mode spectral peak may be determined using equation (6):

$$\rho = \frac{(I_{circ})_{max}}{(I_{circ})_{min}} = \frac{|1 + r\exp(-\alpha p)|^2}{|1 - r\exp(-\alpha p)|^2} = \frac{|1 + r'|^2}{|1 - r'|^2} \quad (6)$$

The ratio may also be determined using an average of adjacent maximum intensities as the maximum intensity characterizing the peak and/or an average of adjacent minimum intensities as the minimum intensity characterizing the peak, according to some embodiments of the present invention. Furthermore, a value of an amplitude change over a round-trip due to both mirror losses and a material absorption of the sample may be determined from the ratio $\rho$ as shown in equation (7):

$$r' = \frac{\sqrt{\rho} - 1}{\sqrt{\rho} + 1} \quad (7)$$

According to some embodiments of the present invention, an absorption coefficient due to the reflective surfaces and the material within the cavity may be computed using equation (8) shown below.

$$2\alpha' = -\frac{2}{p}\log r' = -\frac{2}{p}\log\frac{\sqrt{\rho} - 1}{\sqrt{\rho} + 1} \quad (8)$$

An intensity ratio, $\rho$, and a round trip path length, p, may be extracted from experimental data as described above. FIG. 4 depicts a result of measuring the transmitted intensity 80 through a low-finesse, F≈3.8, cavity with a round-trip length p=48.5 cm containing room air at atmospheric pressure according to some embodiments of the present invention. The laser light source was a distributed feedback (DFB) laser with a nominal wavelength of 1.391 μm, near which water vapor exhibits a number of strong absorption features. The temperature of the laser light source was stabilized while the laser current was modulated by a triangular wave that swept the frequency of the emitted light over 1 cm$^{-1}$ in 3.5 ms. The output intensity was measured using an optical detector sampled at a rate of 2.5 MHz, and an average over 100 scan cycles was computed. Positions and values of local extrema 90 were located and determined by fitting a parabola through a collection of nine samples closest to each extremum. In some embodiments. positions and values of local extrema 90 may also be located by selecting the experimentally measured maximum or minimum point of the peak.

Figure 5:
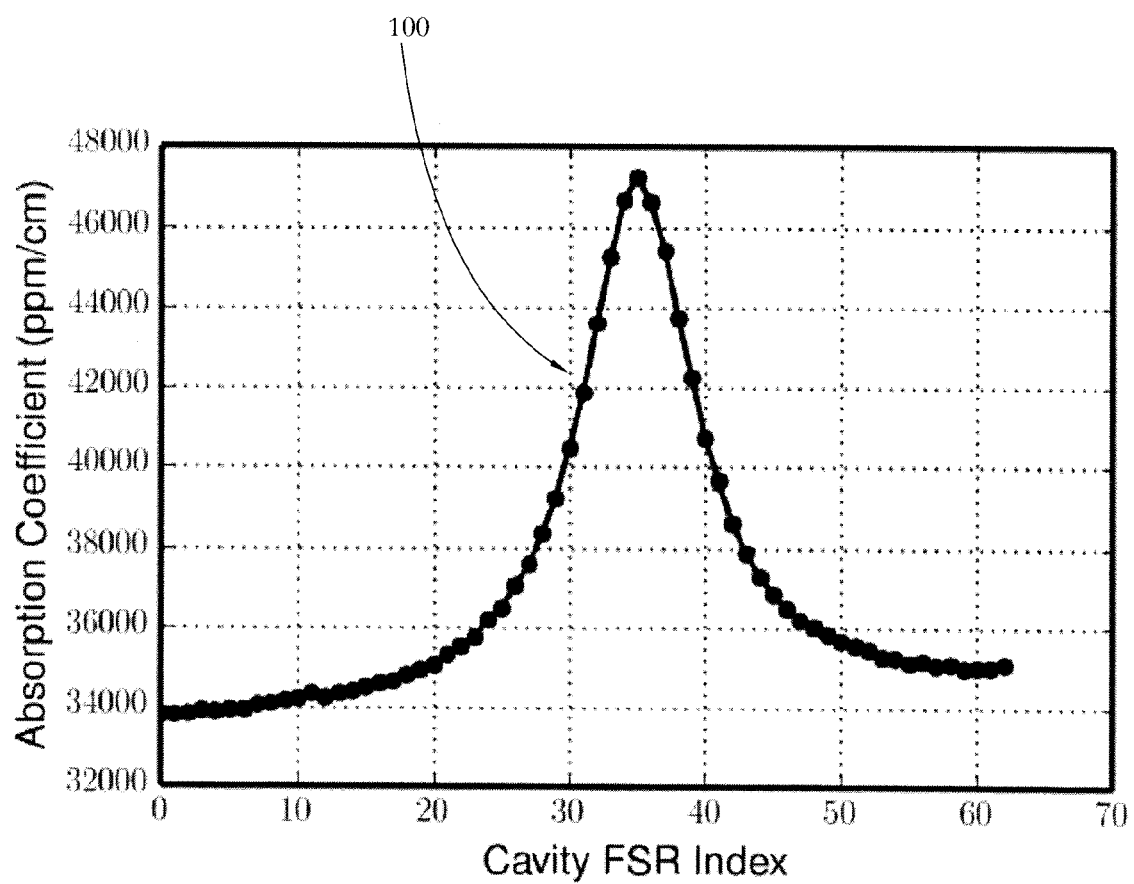
FIG. 5 shows an absorption spectrum derived from maximum-minimum intensity ratios according to some embodiments of the present invention.

Total loss due to cavity reflective surfaces and sample inside the cavity may be computed using equation (8) from a collection of intensity ratios defined by extrema 90, according to some embodiments of the present invention. FIG. 5 depicts a spectrum 100 of a total absorption coefficient generated according to equation (2). The horizontal (frequency) axis is labeled according to the longitudinal mode index. If the longitudinal mode index is known to be equally spaced by a cavity free spectral range (FSR), the frequency values corresponding to the longitudinal mode index may be known with precision.

Curve Fitting Analysis

According to some embodiments of the present invention, a sample absorption coefficient may be determined by fitting a curve to a shape of a longitudinal mode resonance spectral peak over a determined frequency range. In the experimental example presented above, in which an absorption coefficient was determined by intensity ratios, the cavity was so lossy, with an effective ring-down time of 1 ns, that the transmitted intensity at each local minimum was still large enough to be accurately measured. Due to the relatively large transmitted intensity, it was possible to measure the ratio of maximum to minimum transmitted intensity with reasonable precision and use ratios to derive a meaningful absorption coefficient. In the case of a less lossy cavity, for example one with a ring-down time of 30 ns and round trip path length of p=48.5 cm, the ratio of maximum to minimum intensity may be relatively large (e.g. 1700). Measuring such a large intensity ratio precisely may be challenging, requiring the use of high dynamic range data acquisition electronics or perhaps several processing channels with different gains to capture both the maxima and minima effectively. An additional problem can arise from the parasitic excitation of transverse modes in the cavity, which can raise the minimum intensities to such an extent that intensity ratios become inaccurate. If intensity ratios are inaccurate, it may be preferable to make more careful use of the detailed shape of a mode resonance as described below.

Consider a range of frequencies extending over two cavity free spectral ranges and centered about a longitudinal mode resonance $v_q$, where q is an integer index. It may be convenient to rewrite equation (1) in terms of a variable $\theta_q = 2\pi(v-v_q)p/c$ which is zero at $v_q$ and varies from $-2\pi$ to $+2\pi$ over the range of interest. This substitution may be written as shown below.

$$\frac{I_{circ}}{I_{inc}} = \frac{|t|^2}{|1 - r'\exp(-j\theta_q)|^2} = \frac{|t|^2}{1 - 2r'\exp\theta_q + r'^2} \quad (9)$$

Equation (9) can then be solved to show a transmitted intensity as shown below in equation (10):

$$I_{trans} = \frac{A}{1 - 2r'\cos\theta_q + r'^2}. \quad (10)$$

In equation (10), A is a factor which depends on the intensity of incident light, the proportionality between transmitted and circulating intensities, and a value of $|t|^2$. If A and r' are approximately constant over a range $\theta_q \in (-2\pi, 2\pi)$, we may use curve fitting analysis to determine r' and A from the measurements of $I_{trans}$.

Starting from the average measured transmitted intensity shown in FIG. 4 we may consider local extrema in turn and identify the local extrema as corresponding to transverse mode resonances at frequency $v_g$ for successive values of q, according to some embodiments of the present invention. The interval from $v_{q-1}$ to $v_{q+1}$ may be mapped linearly to the interval $(-2\pi, 2\pi)$ and the local extrema 90 may be used as data for a least-squares fitting problem using the model of equation (10). In effect, it may be assumed that over a small frequency range, the relationship between time and laser frequency is approximately linear. Since the relationship between time and laser frequency may not be precisely linear, it may be useful to introduce an additional parameter into the fit in order to allow the value of $\theta_q$ to be offset so as to better fit the data.

Figure 6:
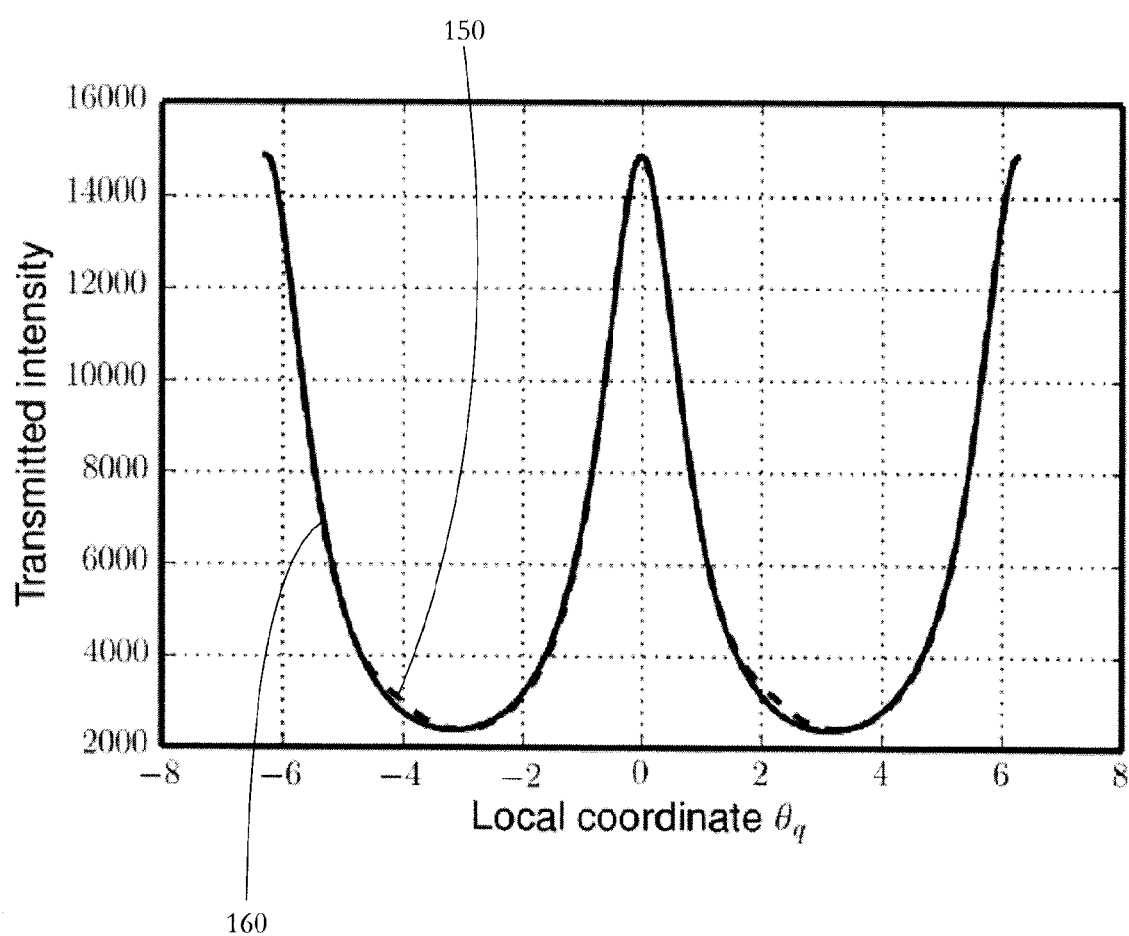
FIG. 6 depicts a curve-fitting process performed on a longitudinal mode resonance spectral peak according to some embodiments of the present invention.

FIG. 6 depicts a result of a least-squares fit performed on the optical cavity mode spectrum around a particular longitudinal mode resonance spectral peak. Dashed curve 150 depicts the unmodified data, while solid curve 160 depicts the best fitting model. It may be seen from FIG. 6 that the fit is generally good, except for the presence of an additional transverse mode which is seen in a residual between dashed curve 150 and solid curve 160. A sample absorption coefficient may be determined from the fit parameter(s) of solid curve 160.

Figure 7:
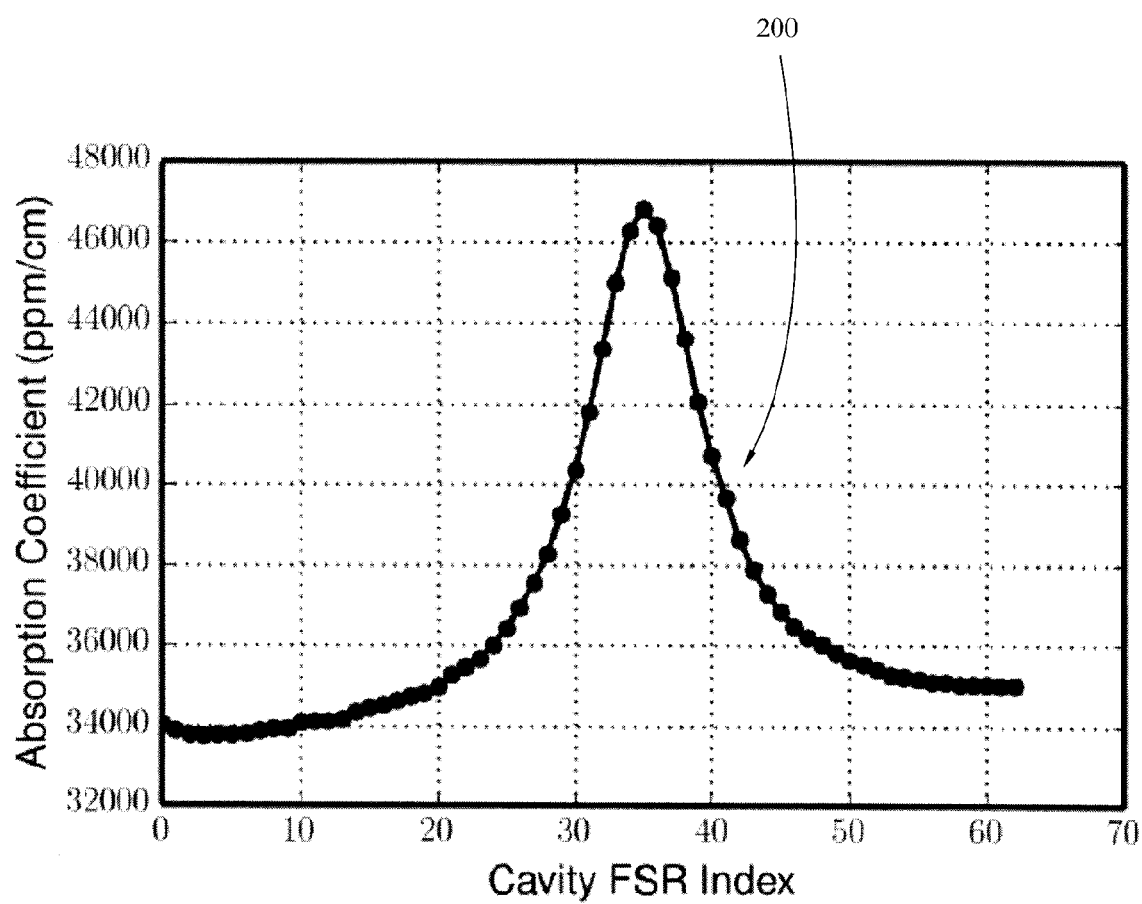
FIG. 7 shows an absorption spectrum derived from fitting mode resonances according to some embodiments of the present invention.

FIG. 7 depicts an absorption spectrum 200 derived from curve fitting longitudinal mode resonance spectral peaks as illustrated in FIG. 6. By successively performing a sequence of curve fits for each longitudinal mode resonance spectral peak and deriving an absorption coefficient from fit parameter r', a graph similar to FIG. 7 may be derived according to some embodiments of the present invention. A method employing curve-fitting performed on longitudinal mode resonance spectral peaks may be preferred over a method employing maximum/minimum intensity ratios when resonances are sharp and the intensity minima have relatively low values. The exemplary curve-fitting method depicted in FIG. 7 fits the entire shape or at least a significant part (e.g. a majority) of the mode resonance peak, rather than merely a ratio of intensities of extrema as shown in FIG. 5.

Figure 8:
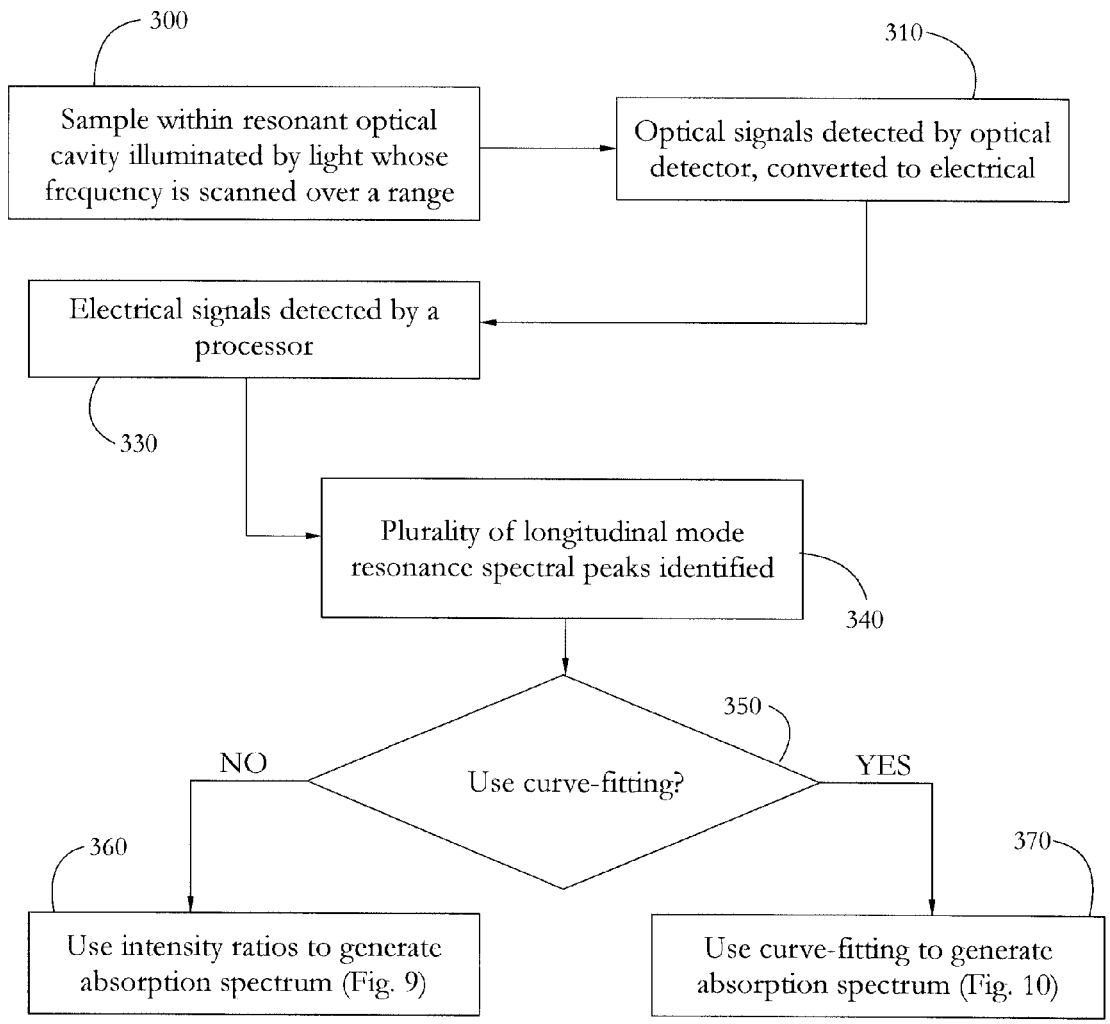
FIG. 8 depicts an exemplary sequence of steps performed by a spectroscopy system according to some embodiments of the present invention.

FIG. 8 depicts an exemplary sequence of steps performed by a spectroscopy system according to some embodiments of the present invention. In a step 300, a sample placed in a resonant optical cavity is illuminated by laser light whose frequency is scanned over a range of interest under the control of a computer system. In particular, the frequency range of interest encompasses a plurality of longitudinal mode resonance spectral peaks. An interaction of the sample with the light introduced by the source affects optical signals that are emitted from the cavity.

In a step 310, optical signals emitted from the cavity are detected by optical detector 18, which generates corresponding electrical signals in response. In a step 330, a processor of the computer system receives the electrical signals via the electrical connection between the computer system and the optical detector. The signals may be processed according to calibration data, signals received from second optical detector 19, and power and wavelength data received from light source 16 in order to reduce the effect of extraneous factors such as scanning speed or input laser linewidth on the absorption spectrum determination.

The processor then identifies a plurality of longitudinal mode resonance spectral peaks defined by the electrical signals in a step 340. In a step 350, the processor determines whether to use curve-fitting and/or intensity ratio analysis to generate an absorption spectrum as described above. The choice of analysis method may be performed according to a measured ring-down time of the resonant optical cavity with or without the sample present. In some embodiments, if the measured ring-down time is less than (or less than or equal to) a predetermined threshold a sample absorption spectrum is determined according to intensity ratio analysis as illustrated by a step 360. If the measured ring-down time is greater than (or greater than or equal to) the predetermined threshold, then a sample absorption spectrum is determined according to curve fitting analysis, as illustrated by a step 370. In some embodiments, the predetermined threshold has a value between 10 ns and 100 ns, for example between 20 ns and 50 ns, more particularly between 25 ns and 40 ns, specifically about 30 ns. An intensity ratio analysis method illustrated by step 360 is explained in further detail with reference to FIG. 9. A curve fitting analysis method illustrated by step 370 is explained in further detail with reference to FIG. 10.

Figure 9:
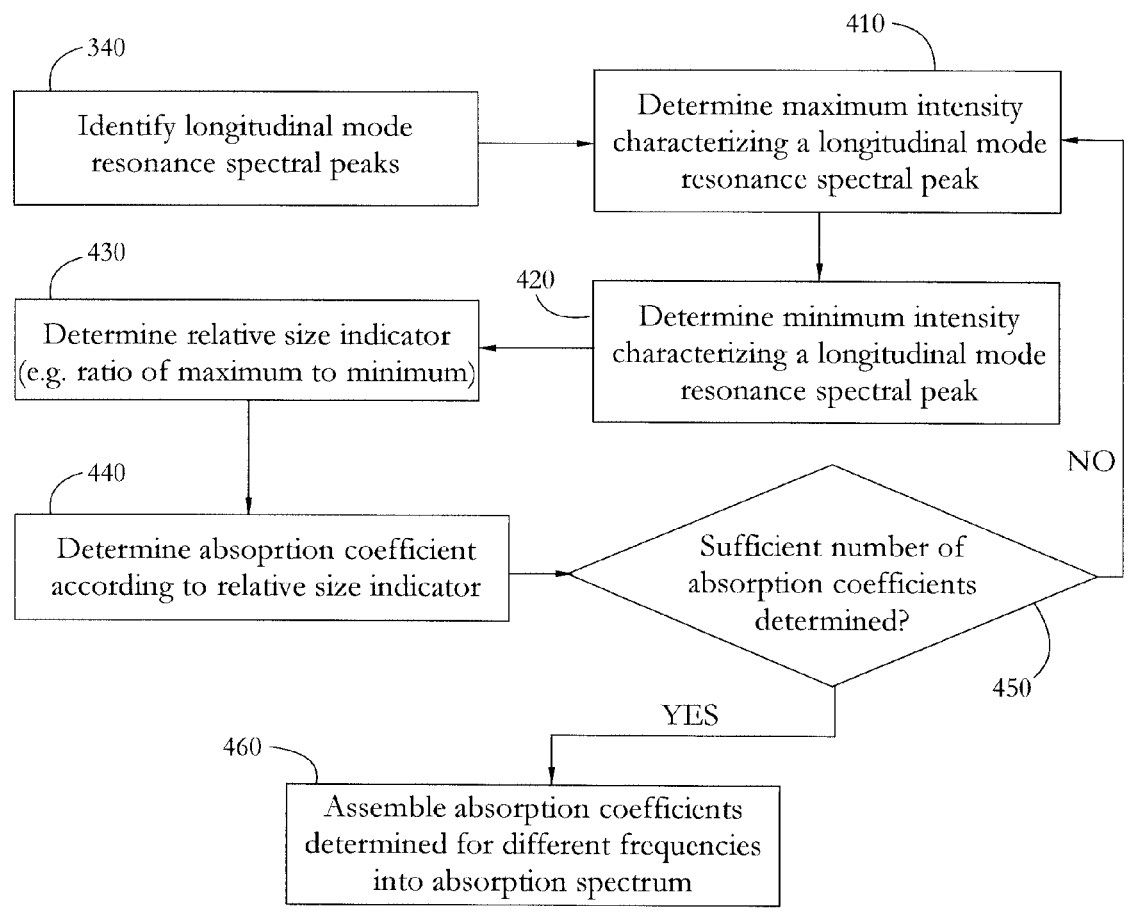
FIG. 9 shows an exemplary series of steps executed by a processor to generate a sample absorption spectrum using intensity ratio analysis according to some embodiments of the present invention.

FIG. 9 depicts an exemplary series of steps executed by a processor to generate a sample absorption spectrum using intensity ratio analysis according to some embodiments of the present invention. In a step 410, a maximum intensity characterizing a longitudinal mode resonance spectral peak is determined. The maximum intensity may be determined by fitting a curve over a plurality of samples near the maximum of the longitudinal mode resonance spectral peak, by selecting the experimentally measured maximum value along the longitudinal mode resonance spectral peak, and/or by selecting one or more other points indicative of the intensity maximum and determining a maximum intensity from the selected values. In a step 420, the processor determines a minimum intensity characterizing the longitudinal mode resonance spectral peak. The minimum intensity may be determined by fitting a curve over a plurality of samples near a minimum of the longitudinal mode resonance spectral peak, by selecting an experimentally measured minimum value along the longitudinal mode resonance spectral peak, and/or by selecting one or more other points indicative of the intensity minimum and determining a minimum intensity from the selected values. In some embodiments, localized curve-fitting to determine local extrema may be performed using a parabolic function and a predetermined number (e.g. 5-15, for example about nine) of samples. In a step 430, the processor determines an indicator of the relative size of the maximum and minimum peak values, for example a ratio of the maximum intensity to the minimum intensity. In a step 440, a sample absorption coefficient for a given frequency is determined according to the relative size indicator, as described above.

In a step 450, the processor determines whether or not a condition has been met in order to generate a sample absorption spectrum. If absorption coefficients have not yet been determined for an entire predetermined frequency range of interest, another longitudinal mode spectral peak at the next different frequency is analyzed. In this case, the processor begins again at step 410 resulting in the determination of another sample absorption coefficient at step 440 according to another intensity ratio analysis. Once absorption coefficient values spanning the frequency range of interest have been determined, the absorption coefficients are assembled into a spectrum for the frequency range of interest, as illustrated by a step 460.

Figure 10:
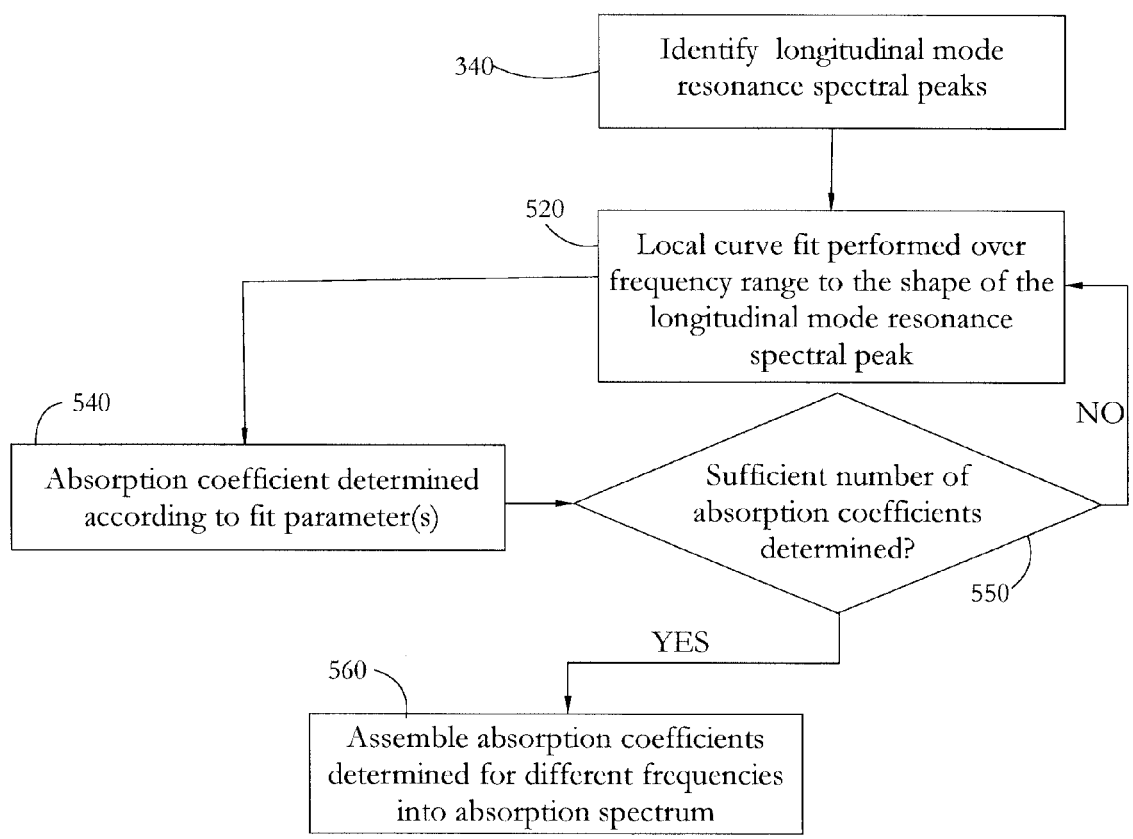
FIG. 10 shows an exemplary series of steps executed by a processor to generate a sample absorption spectrum using curve-fitting according to some embodiments of the present invention.

FIG. 10 depicts an exemplary series of steps executed by a processor to generate a sample absorption spectrum using curve fitting analysis according to some embodiments of the present invention. In a step 520, the processor performs a curve fit to a shape of an identified longitudinal mode resonance spectral peak. The peak extent used for curve-fitting may be defined by a frequency range extending over two cavity free spectral ranges and centered at the frequency of the peak maximum. Step 520 results in the determination of one or more curve fit parameters, as described above. In a step 540, a sample absorption coefficient is determined from the fit parameter(s).

In a step 550, the processor determines whether or not a condition has been met in order to generate a sample absorption spectrum. If absorption coefficients have not yet been determined for an entire predetermined frequency range of interest, another longitudinal mode spectral peak at the next different frequency is analyzed. In this case, the processor begins again at step 520, resulting in the determination of another sample absorption coefficient. Once absorption coefficient values spanning the frequency range of interest have been determined, the absorption coefficients are assembled into a spectrum for the frequency range of interest, as illustrated by a step 560.

CONCLUSION

Traditional CRDS uses a high-finesse resonant optical cavity to determine an absorption spectrum of a material which interacts weakly with light. The high mirror reflectivity present in a high-finesse resonant optical cavity creates a relatively long effective interaction distance between the light and the sample. Loss at a given frequency is measured in the time domain by monitoring the decay of the intensity from the cavity output with optical detectors when the light excitation is turned off. CRDS becomes less accurate when the sample absorption is large, say >1000 ppm cm$^{-1}$. In this situation, the optical cavity becomes effectively opaque and the resulting ring-down times become so short, for example <30 ns, that the ring-down times may be difficult to measure. Under these conditions, direct absorption spectroscopy can produce more accurate results. Direct absorption spectroscopy involves directly measuring the intensity transmission through the optical cavity with a sample and comparing the results to the measured intensity transmission through an empty optical cavity. However, direct absorption spectroscopy becomes less accurate when attempting to measure small amounts of sample or samples that interact weakly with light. The exemplary systems and methods described above are particularly suitable for characterizing samples in a middle regime, between regimes better suited for CRDS and direct absorption spectroscopy.

Consider for example a resonant optical cavity constructed to have a ring-down time of 30 ns, corresponding to a baseline loss of 1000 ppm cm$^{-1}$. For this cavity, $(\Delta v)_{FWHM}$=5.3 MHz, and it is possible to sweep the laser frequency at R<<88 THz s$^{-1}$ while remaining in the quasi-static regime. A spectrum may be collected by scanning the laser frequency linearly up and down over a range of 1 cm$^{-1}$; a scan cycle is completed in no less than 680 µs. It would thus be possible to collect about 1500 scan cycles per second, from which the spectrum of the cavity may be obtained via averaging. A maximum scan rate varies as $\tau^{-2}$, so that a cavity constructed with a ring-down time of 300 ns could be scanned over the same frequency range at 15 scan cycles per second to remain in the quasi-static regime. The difference between the analysis of the cavity with a ring-down time of 30 ns and the cavity with a ring-down time of 300 ns illustrates the transition between the regimes in which conventional time-domain CRDS is particularly useful (large values of $\tau$) and in which monitoring the transmitted intensity with direct absorption spectroscopy is particularly useful (small values of $\tau$). A cavity with a ring-down time of 30 ns has an effective path length of only 9 m, so the amount of cavity enhancement is modest. Nonetheless, by taking advantage of the mode structure, it becomes possible to extract the absorption spectrum of the sample within the cavity without having to monitor the input intensity. Furthermore, the regularly-spaced cavity modes act as a built-in (relative) frequency calibration, which can remove the need for an additional precise wavelength monitor. The present invention seeks to perform self-referencing cavity enhanced spectroscopy accurately in low finesse optical cavities with high material absorption properties where CRDS is largely ineffective.

Both intensity ratio analysis and curve-fitting analysis as described above may be considered conceptually to be examples of a generalized curve-fitting approach, with intensity ratio analysis effectively fitting two intensity values of a longitudinal spectral peak (the special points of the maximum and minimum) to a model of the peak, and curve fitting analysis fitting a larger number of intensity values to the model.

It will be clear to one skilled in the art that the embodiments described herein may be altered in many ways without departing from the scope of the invention. For example, frequency scanning as described above need not be linear, but may be performed according to a sinusoidal sweep, or another sweep function that ideally is sufficiently slow. Accordingly, the scope of the invention should be determined by the following claims and their legal equivalents.

What is claimed is:

1. A spectroscopy apparatus comprising:
   a resonant optical cavity configured to hold a sample;
   an optical detector configured to detect optical signals emitted from the optical cavity and generate electrical signals from the optical signals, the optical signals defining a plurality of intensity values characterizing a response of the sample to light in the optical cavity as a frequency of the light is scanned over a range of frequencies spanning a plurality of longitudinal mode resonance spectral peaks; and
   a processor electrically connected to the optical detector and configured to determine, from the electrical signals, a sample absorption coefficient by fitting at least two intensity values characterizing a longitudinal mode resonance spectral peak to a model of the longitudinal mode resonance spectral peak, wherein the at least two intensity values comprise a maximum intensity and a minimum intensity characterizing the longitudinal mode resonance spectral peak, and wherein the processor is configured to perform at least one of:
   i. determining the maximum intensity characterizing the longitudinal mode resonance spectral peak by averaging a maximum intensity of the longitudinal mode resonance spectral peak and a maximum intensity of an immediately neighboring longitudinal mode resonance spectral peak, and
   ii. determining the minimum intensity characterizing the longitudinal mode resonance spectral peak by averaging a minimum intensity of the longitudinal mode resonance spectral peak and a minimum intensity of an immediately neighboring longitudinal mode resonance spectral peak.

2. The apparatus of claim 1, wherein the processor is configured to determine the sample absorption coefficient according to a ratio of the maximum intensity to the minimum intensity.

3. The apparatus of claim 2, wherein the processor is configured to determine the sample absorption coefficient according to a logarithm of a function of the ratio.

4. The apparatus of claim 2, wherein a ring-down time of the optical cavity is less than 60 ns.

5. The apparatus of claim 1, wherein the processor is configured to determine the maximum intensity characterizing the longitudinal mode resonance spectral peak by averaging the maximum intensity of the longitudinal mode resonance spectral peak and the maximum intensity of the immediately neighboring longitudinal mode resonance spectral peak.

6. The apparatus of claim 1, wherein the processor is configured to determine the minimum intensity characterizing the longitudinal mode resonance spectral peak by averaging the minimum intensity of the longitudinal mode resonance spectral peak with the minimum intensity of the immediately neighboring longitudinal mode resonance spectral peak.

7. The apparatus of claim 1, wherein the processor is configured to perform at least one function selected from:
determining the maximum intensity characterizing the longitudinal mode resonance spectral peak by fitting a curve over a plurality of points of the longitudinal mode resonance peak; and
determining the minimum intensity characterizing the longitudinal mode resonance spectral peak by fitting a curve to a plurality of points of the longitudinal mode resonance peak.

8. The apparatus of claim 7, wherein the processor is configured to determine the maximum intensity characterizing the longitudinal mode resonance spectral peak by curve fitting.

9. The apparatus of claim 7, wherein the processor is configured to determine the minimum intensity characterizing the longitudinal mode resonance spectral peak by curve fitting.

10. The apparatus of claim 1, wherein the processor is configured to determine the sample absorption coefficient by fitting at least three intensity values characterizing the longitudinal mode resonance spectral peak to the model of the longitudinal mode resonance spectral peak.

11. The apparatus of claim 1, wherein the processor is configured to determine the sample absorption coefficient by fitting a curve to a shape of the longitudinal mode resonance spectral peak.

12. The apparatus of claim 11, wherein the ring-down time of the optical cavity is greater than or equal to 10 ns.

13. The apparatus of claim 11, wherein fitting the curve is performed over a frequency range encompassing two cavity free spectral ranges.

14. The apparatus of claim 11, wherein the processor is configured to generate an absorption spectrum according to successive curve fittings of longitudinal mode resonance spectral peaks.

15. The apparatus of claim 1, wherein the processor is further connected to a monochromatic light source optically coupled to the resonant optical cavity, the processor being configured to control the monochromatic light source to scan the frequency of light emitted by the light source over the range of frequencies spanning the plurality of longitudinal mode resonance spectral peaks of the resonant optical cavity.

16. The apparatus of claim 1, wherein the processor is configured to assemble a plurality of absorption coefficients to generate an absorption spectrum for the sample.

17. The apparatus of claim 1, wherein the cavity is a confocal cavity.

18. The apparatus of claim 1, further comprising a spatial optical filter positioned in an optical path between the cavity and the optical detector, and configured to filter out higher-order transverse modes from the light incident on the optical detector.

19. The apparatus of claim 1, further comprising a second optical detector positioned outside the cavity to detect light emitted by a light source and reflected by an input mirror of the cavity, the light source being external to the cavity, wherein the processor is configured to determine the sample absorption coefficient according to an optical power indicator signal received from the second optical detector.

20. A non-transitory computer-readable medium storing instructions which, when executed by a hardware processor, cause the processor to:
receive electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and
determine, from the electrical signals, a sample absorption coefficient by fitting at least two intensity values characterizing a longitudinal mode resonance spectral peak to a model of the longitudinal mode resonance spectral peak, wherein the at least two intensity values comprise a maximum intensity and a minimum intensity characterizing the longitudinal mode resonance spectral peak, and wherein the instructions further cause the processor to perform at least one of:
i. determining the maximum intensity characterizing the longitudinal mode resonance spectral peak by averaging a maximum intensity of the longitudinal mode resonance spectral peak and a maximum intensity of an immediately neighboring longitudinal mode resonance spectral peak, and
ii. determining the minimum intensity characterizing the longitudinal mode resonance spectral peak by averaging a minimum intensity of the longitudinal mode resonance spectral peak and a minimum intensity of an immediately neighboring longitudinal mode resonance spectral peak.

21. The computer-readable medium of claim 20, wherein the instructions cause the processor to determine the sample absorption coefficient according to a ratio of the maximum intensity to the minimum intensity.

22. The computer-readable medium of claim 21, wherein the instructions cause the processor to determine the sample absorption coefficient according to a logarithm of a function of the ratio.

23. The computer-readable medium of claim 21, wherein a ring-down time of the optical cavity is less than 60 ns.

24. The computer-readable medium of claim 20, wherein the instructions cause the processor to determine the maximum intensity characterizing the longitudinal mode resonance spectral peak by averaging the maximum intensity of the longitudinal mode resonance spectral peak and the maximum intensity of the immediately neighboring longitudinal mode resonance spectral peak.

25. The computer-readable medium of claim 20, wherein the instructions cause the processor to determine the minimum intensity characterizing the longitudinal mode resonance spectral peak by averaging the minimum intensity of the longitudinal mode resonance spectral peak with the minimum intensity of the immediately neighboring longitudinal mode resonance spectral peak.

26. The computer-readable medium of claim 20, wherein the instructions cause the processor to perform at least one function selected from:
   determining the maximum intensity characterizing the longitudinal mode resonance spectral peak by fitting a curve over a plurality of points of the longitudinal mode resonance peak; and
   determining the minimum intensity characterizing the longitudinal mode resonance spectral peak by fitting a curve to a plurality of points of the longitudinal mode resonance peak.

27. The computer-readable medium of claim 26, wherein the instructions cause the processor to determine the maximum intensity characterizing the longitudinal mode resonance spectral peak by curve fitting.

28. The computer-readable medium of claim 26, wherein the instructions cause the processor to determine the minimum intensity characterizing the longitudinal mode resonance spectral peak by curve fitting.

29. The computer-readable medium of claim 20, wherein the instructions cause the processor to determine the sample absorption coefficient by fitting at least three intensity values characterizing the longitudinal mode resonance spectral peak to the model of the longitudinal mode resonance spectral peak.

30. The computer-readable medium of claim 20, wherein the instructions cause the processor to determine the sample absorption coefficient by fitting a curve to a shape of the longitudinal mode resonance spectral peak.

31. The computer-readable medium of claim 30, wherein the ring-down time of the optical cavity is greater than or equal to 10 ns.

32. The computer-readable medium of claim 30, wherein fitting the curve is performed over a frequency range encompassing two cavity free spectral ranges.

33. The computer-readable medium of claim 30, wherein the instructions cause the processor to generate an absorption spectrum according to successive curve fittings of longitudinal mode resonance spectral peaks.

34. The computer-readable medium of claim 20, wherein the instructions cause the processor to control a monochromatic light source to scan the frequency of light emitted by the light source over the range of frequencies spanning the plurality of longitudinal mode resonance spectral peaks of the resonant optical cavity, wherein the monochromatic light source is optically coupled to the resonant optical cavity.

35. The computer-readable medium of claim 20, wherein the instructions cause the processor to assemble a plurality of absorption coefficients to generate an absorption spectrum for the sample.

36. The computer-readable medium of claim 20, wherein the cavity is a confocal cavity.

37. The computer-readable medium of claim 20, wherein the instructions cause the processor to determine the sample absorption coefficient according to an optical power indicator signal received from a second optical detector positioned outside the cavity to detect light emitted by a light source and reflected by an input mirror of the cavity, the light source being external to the cavity.

38. A computer system comprising a hardware processor and associated memory configured to:
   receive electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and
   determine, from the electrical signals, a sample absorption coefficient by fitting at least two intensity values characterizing a longitudinal mode resonance spectral peak to a model of the longitudinal mode resonance spectral peak, wherein the at least two intensity values comprise a maximum intensity and a minimum intensity characterizing the longitudinal mode resonance spectral peak, and wherein the processor is configured to perform at least one of:
      i. determining the maximum intensity characterizing the longitudinal mode resonance spectral peak by averaging a maximum intensity of the longitudinal mode resonance spectral peak and a maximum intensity of an immediately neighboring longitudinal mode resonance spectral peak, and
      ii. determining the minimum intensity characterizing the longitudinal mode resonance spectral peak by averaging a minimum intensity of the longitudinal mode resonance spectral peak and a minimum intensity of an immediately neighboring longitudinal mode resonance spectral peak.

39. A method comprising:
receiving electrical signals generated from optical signals emitted from a resonant optical cavity configured to hold a sample, the optical signals characterizing a response of the sample to light in the optical cavity as a frequency of the light is scanned over a range of frequencies spanning a plurality of longitudinal mode resonance spectral peaks; and
determining, from the electrical signals and using a hardware processor, a sample absorption coefficient by fitting at least two intensity values characterizing a longitudinal mode resonance spectral peak to a model of the longitudinal mode resonance spectral peak, wherein the at least two intensity values comprise a maximum intensity and a minimum intensity characterizing the longitudinal mode resonance spectral peak, and wherein the processor is configured to perform at least one of:
   i. determining the maximum intensity characterizing the longitudinal mode resonance spectral peak by averaging a maximum intensity of the longitudinal mode resonance spectral peak and a maximum intensity of an immediately neighboring longitudinal mode resonance spectral peak, and
   ii. determining the minimum intensity characterizing the longitudinal mode resonance spectral peak by averaging a minimum intensity of the longitudinal mode resonance spectral peak and a minimum intensity of an immediately neighboring longitudinal mode resonance spectral peak.

* * * * *